(12) United States Patent
Matthews et al.

(10) Patent No.: US 10,595,300 B2
(45) Date of Patent: Mar. 17, 2020

(54) CHANNEL HOPPING SEQUENCE GENERATION WITH VARIABLE CHANNEL WIDTH

(71) Applicant: Landis + Gyr Innovations, Inc., Alpharetta, GA (US)

(72) Inventors: Justin Clifford Matthews, Arncliffe (AU); Matthew Donald Karlgaard, Nisswa, MN (US); Govind Kharangate, Rosebery (AU); Michael Sean Holcombe, Roswell, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 53 days.

(21) Appl. No.: 16/009,930

(22) Filed: Jun. 15, 2018

(65) Prior Publication Data
US 2019/0387499 A1 Dec. 19, 2019

(51) Int. Cl.
| | | |
|---|---|---|
| *H04W 72/02* | (2009.01) | |
| *H04W 72/04* | (2009.01) | |
| *H04W 72/08* | (2009.01) | |
| *H04B 1/7136* | (2011.01) | |
| *H04W 84/18* | (2009.01) | |

(52) U.S. Cl.
CPC .......... *H04W 72/02* (2013.01); *H04B 1/7136* (2013.01); *H04W 72/0446* (2013.01); *H04W 72/085* (2013.01); *H04B 2201/71384* (2013.01); *H04W 84/18* (2013.01)

(58) Field of Classification Search
CPC ... H04L 5/0012; H04L 5/0048; H04L 5/0053; H04L 5/001; H04L 5/14; H04L 27/2613; H04L 5/0055; H04W 72/0446; H04W 72/0453; H04W 72/0413; H04W 72/042;
(Continued)

(56) References Cited

U.S. PATENT DOCUMENTS

| | | | |
|---|---|---|---|
| 5,586,120 A | 12/1996 | Cadd | |
| 6,112,094 A * | 8/2000 | Dent | ...................... H04B 1/713 375/132 |

(Continued)

OTHER PUBLICATIONS

PCT Patent Application No. PCT/US2019/034091, International Search Report and Written Opinion, dated Oct. 4, 2019, 11 pages.

*Primary Examiner* — Michael J Moore, Jr.
(74) *Attorney, Agent, or Firm* — Kilpatrick Townsend & Stockton LLP

(57) ABSTRACT

In some aspects, a channel hopping sequence for communication on a mesh network is generated. The hopping sequence may include multiple channels assigned to respective positions in the hopping sequence. In some cases, a first channel is assigned to a first position such that the first channel may transmit communications in a first transmission mode, such as a low-bandwidth transmission mode. In addition, an additional channels adjacent to the first channel is also assigned to the first position such that the combination of the first channel and additional channel may transmit communications in a second transmission mode, such as a high-bandwidth transmission mode. In some cases, a whitelist is determined based on the assigned channels. The whitelist may indicate channels that do not conflict with the assigned channels during transmission of a communication. In addition, channels may be assigned to the hopping sequence based on the whitelist.

20 Claims, 9 Drawing Sheets

(58) Field of Classification Search
CPC ... H04W 74/0833; H04W 88/08; H04W 4/70; H04B 1/713; H04B 1/7143; H04B 1/7156
See application file for complete search history.

(56) References Cited

U.S. PATENT DOCUMENTS

| | | | |
|---|---|---|---|
| 8,412,758 B2* | 4/2013 | Numminen | G06F 7/58 |
| | | | 708/250 |
| 2010/0189032 A1* | 7/2010 | Chen | H04B 1/7143 |
| | | | 370/328 |
| 2016/0254839 A1 | 9/2016 | Dahlman et al. | |
| 2017/0223743 A1* | 8/2017 | Lin | H04L 27/2614 |
| 2019/0052308 A1* | 2/2019 | Niu | H04B 1/7143 |
| 2019/0149190 A1* | 5/2019 | Liu | H04W 4/025 |
| | | | 375/132 |
| 2019/0158139 A1* | 5/2019 | Talarico | H04B 1/7143 |
| 2019/0181995 A1* | 6/2019 | Liu | H04W 72/0446 |
| 2019/0238177 A1* | 8/2019 | Liu | H04B 1/713 |

* cited by examiner

CHANNEL HOPPING SEQUENCE GENERATION WITH VARIABLE CHANNEL WIDTH

FIELD OF THE INVENTION

This disclosure relates generally to the field of wireless data transmission, and more specifically relates to determining a channel hopping sequence for multiple rates of data transmission.

BACKGROUND

Components in a wireless mesh network may exchange data via at least one radio frequency (RF). A component on the mesh network may transmit data to another component via a channel that includes a range of one or more frequencies, or a channel "width." In addition, the component may select an additional channel, or "hop" to the additional channel. For example, the mesh network component may hop to the additional channel if the component is transmitting data. Also, another component on the mesh network may hop to the additional channel, and begin transmitting data via the additional channel. The mesh network may experience a "collision" if multiple components hop to a particular channel and begin transmitting data. For example, the data on the particular channel may become corrupted or unintelligible to a receiving device, based on the collision.

In some aspects, the wireless mesh network may generate a channel hopping sequence. The hopping sequence may indicate an order in which components on the mesh network select channels for data transmission. In some cases, adherence to the hopping sequence may allow multiple components on the mesh network to transmit data using respective multiple channels without causing collisions. In addition, the RF mesh network may determine a channel hopping sequence based on a technical standard related to operation of a wireless personal area network. However, the channel hopping sequence may be determined based on a given number of channels each having a given width. In such cases, a component on the mesh network may transmit data based on the width of the next available channel in the hopping sequence. The component may be prohibited from using adjacent channels (e.g., channels with adjacent ranges of frequencies) to prevent potential collisions, even if the adjacent channels are not occupied by other transmission from other components.

It is desirable to develop techniques to generate a channel hopping sequence that allows a component of a mesh network to transmit on adjacent channels to the selected channel. It is also desirable to generate a hopping sequence that reduces potential collisions on the adjacent channels if multiple components of the mesh network are transmitting.

SUMMARY

According to certain implementations, a sequence generation module may receive an indication of a group of channels, and an indication of a number from a pseudo-random number generator or a pseudo-random sequence of numbers. The sequence generation module may assign a first channel, from the group of channels, to a hopping sequence at a first position. The assignment may be based on the number from the pseudo-random number generator or the pseudo-random sequence. In addition, the sequence generation module may select an additional channel based on the first channel, such as an additional channel that is adjacent to the first channel. In some cases, frequencies included in a width of the first channel may be available at the first time slot for a first transmission mode. In addition, frequencies included in a combined width of the first and additional channels may be available at the first position for a second transmission mode. The sequence generation module may determine a whitelist subset of the group of channels, where the whitelist subset omits the first and additional channels. In addition, the sequence generation module may assign a second channel, from the whitelist subset, to the hopping sequence at a second position, based on another number from the pseudo-random number generator or in the pseudo-random sequence.

These illustrative implementations are mentioned not to limit or define the disclosure, but to provide examples to aid understanding thereof. Additional implementations are discussed in the Detailed Description, and further description is provided there.

BRIEF DESCRIPTION OF THE DRAWINGS

Features, implementations, and advantages of the present disclosure are better understood when the following Detailed Description is read with reference to the accompanying drawings, where.

DETAILED DESCRIPTION

As discussed above, prior techniques for generating channel hopping sequences do not allow network components to transmit on adjacent channels while reducing potential collisions. Certain implementations described herein provide for generating a hopping sequence based on a subset of channels. In some aspects, the subset of channels may omit a channel that is assigned to the hopping sequence. In addition, the subset of channels may omit another channel that is adjacent to the assigned channel in the hopping sequence. For example, the generated hopping sequence may include, at a first position, an assigned channel that is available for transmissions on a mesh network. An additional channel may be selected based on the assigned channel, such as an additional channel that is adjacent to the assigned channel. A blacklist subset that includes the assigned and additional channels may be determined. A whitelist subset that omits the assigned and additional channels may be determined. A second channel may be assigned to the hopping sequence at a second position, such as a second channel selected from the whitelist subset.

In some aspects, a node on the mesh network may select a channel based on the hopping sequence. For example, the node may select a first channel at a first time slot, as indicated by a first position in the hopping sequence, to use for a transmission of data. The node may determine, such as based on a link quality indicator, that a signal strength between the node and a recipient (e.g., another node on the mesh network) is above a threshold signal level. In some cases, the link quality is determined by a link quality assessment module. Responsive to determining that the signal strength is above the threshold signal level, the node may select a high-bandwidth transmission mode, and transmit the data via the first channel and an additional channel adjacent to the first channel. For example, the node may transmit the data using a combination of the frequencies included in the first channel and the additional channel. During the transmission by the node, an additional node may select a second channel at a second time slot, as indicated by a second position in the hopping sequence. In such cases, as the hopping sequence was generated based on a whitelist that omitted the first and additional channels, data transmitted via first and additional channels may have a reduced likelihood of collisions with data transmitted via the second channel.

Figure 1:
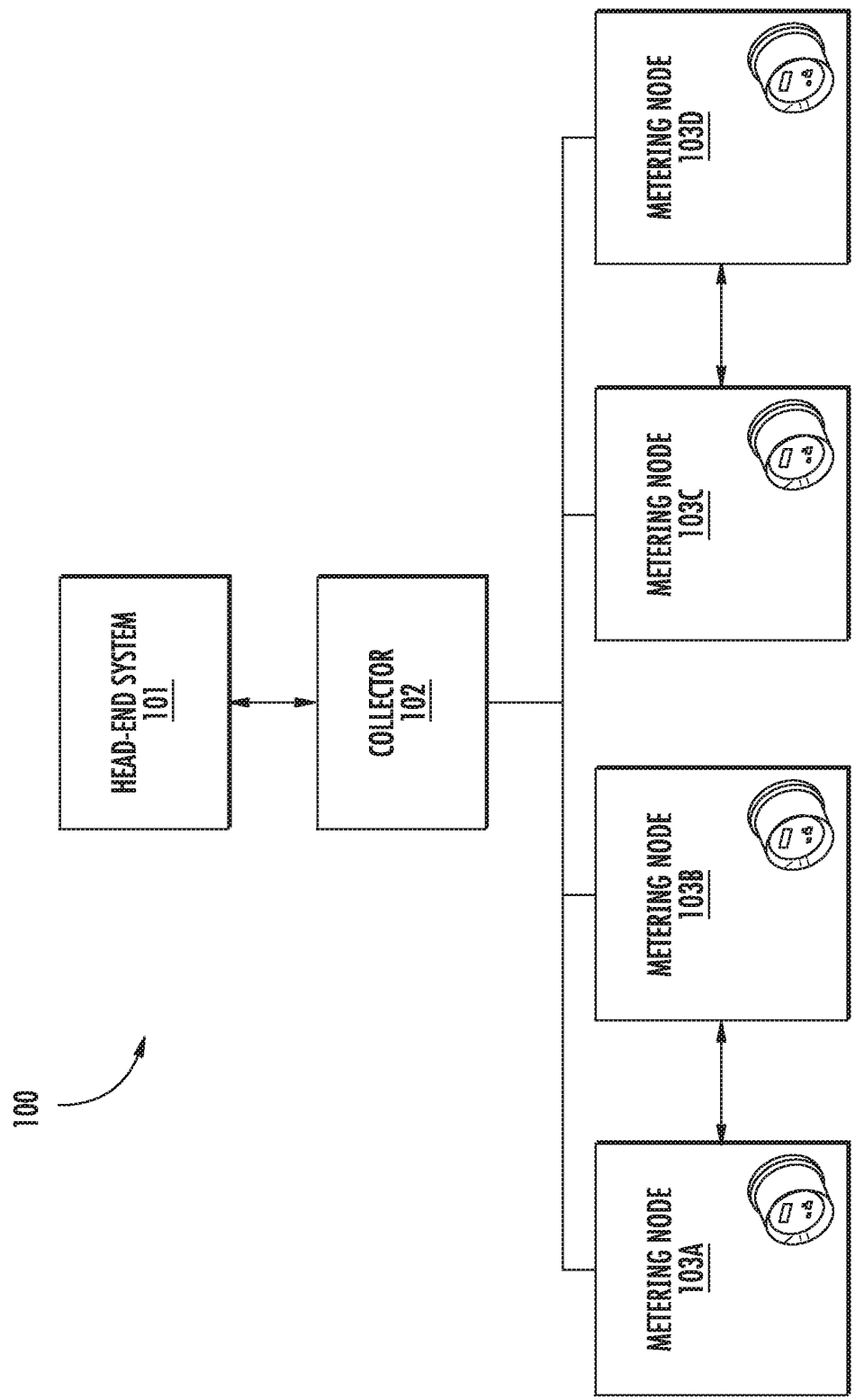
FIG. 1 is a block diagram depicting an example of a mesh network including a collector node and metering nodes.

Referring now to the drawings, FIG. 1 is a block diagram depicting an example of a mesh network 100 including a collector node and metering nodes communicatively coupled to a head-end system. For instance, a head-end system 101 may have bidirectional communication with a collector, such as collector 102. In some cases, collector 102 may communicate to head-end system 101 via one or more networks, such as a private network, a local area network, a wide area network, the Internet, or any other suitable network. In some aspects, the collector 102 may communicate with multiple metering nodes, such as metering nodes 103a, 103b, 103c, and 103d (collectively referred to herein as metering nodes 103). For example, the collector 102 may receive data describing utility metering information from one or more of the metering nodes 103 (e.g., consumption information), or from the head-end system 101 (e.g., pricing information). In addition, the collector 102 may provide data to the head-end system 101, to one or more of the metering nodes 103.

In some aspects, one or more of the metering nodes 103 may communicate with one or more of the other metering nodes. For example, the metering node 103a may communicate with the metering node 103b. Additional metering nodes may or may not communicate with metering node 103a. For example, the metering node 103c may communicate with the metering node 103d, but not with metering node 103a. The collector 102 may receive communications from one or more of the metering nodes 103. In addition, metering node 103a may communicate to the collector 102 information from metering node 103a and metering node 103b. In some cases, a configuration of the mesh network 100 may change, such as based on a weak or strong signal strength detected from the collector 102 or one or more of the metering nodes 103. For example, based on a weak signal strength detected between metering nodes 103a and 103b, metering node 103b may establish a communication with metering node 103c. The signal strength between nodes may be determined by a link quality assessment module that is included in the metering node 103b. Additional signal strengths between nodes may be determined by addition link quality assessment modules, included respectively in one or more of the metering nodes 103, the collector 102, or the head-end system 101.

In some implementations, nodes on the mesh network 100 may transmit data via channels, based on a channel hopping sequence. In addition, one or more of the nodes on the mesh network 100 generate the channel hopping sequence, such as via a sequence generation module that is included in one or more of the metering nodes 103, to collector 102, or the head-end system 101. The sequence generation module may generate the channel hopping sequence based on information received from a pseudo-random number generator, such as a pseudo-random number or sequence of pseudo-random numbers. In one aspect, the sequence generation module may assign at least the next channel in the generated sequence, or it may assign multiple channels in the sequence. In some aspects, a node on the mesh network 100 may select a communication channel based on the hopping sequence. For example, metering node 103a may select a first channel for transmitting data to the collector 102. In some aspects, the metering node 103a may select the channel based in part on a signal strength between the metering node 103a and the collector 102. In addition, each node of the mesh network 100 may store data indicating a list of communication channels capable of transmitting data, such as a channel list indicating communication channels, center frequencies, or frequency ranges associated with the channels.

Figure 2:
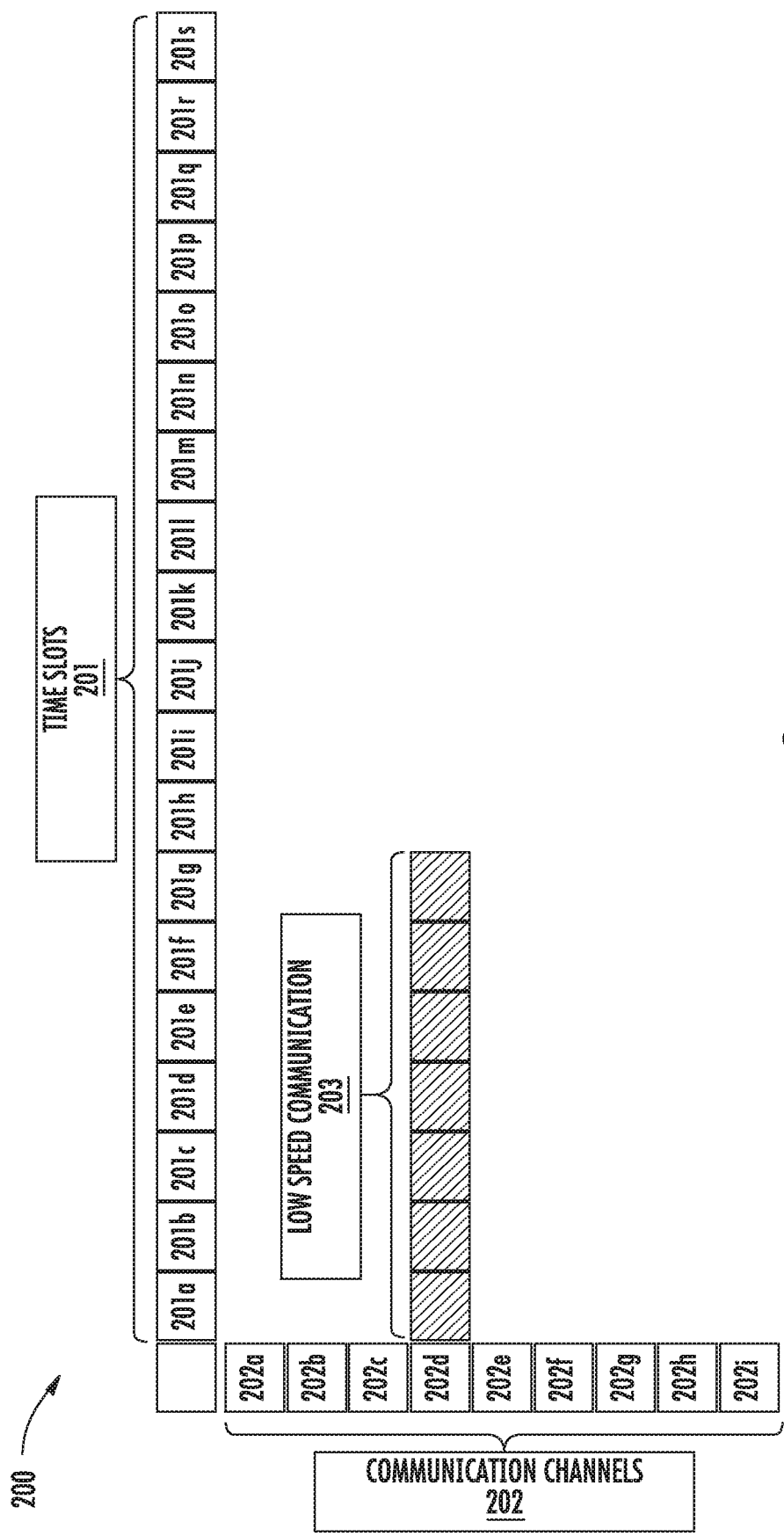
FIG. 2 is a diagram depicting an example of a conventional low-bandwidth transmitted signal.

FIG. 2 is a diagram depicting an example of a transmission environment 200 in which a signal having a channel width and a transmission time may be transmitted. For example, the transmission environment 200 may have multiple timeslots 201a-201s, collectively referred to herein as timeslots 201, and multiple communication channels 202a-202i, collectively referred to herein as communication channels 202. Each of the channels 202 may include one or both of a center frequency or a range of frequencies. For example, the communication channel 202a may include a center frequency of about 902.2 MHz, or a range of frequencies from about 902 MHz to about 902.4 MHz. In some cases, a communication, such as a group of one or more data packets, is transmitted via one or more of the frequencies included in the communication channel 202a. The communication may be transmitted via a signal that is carried on one or more of the channel frequencies.

In some aspects, the transmission environment 200 may be associated with a hopping sequence, such as a frequency hopping spread spectrum (FHSS) environment. FHSS is a method of transmitting radio communications by switching carrier frequencies among multiple channels using a pseudo-random number (or pseudo-random sequence of numbers), that is known by both the transmitting node and the receiving node. In some implementations, the FHSS environment, or communications transmitted in the FHSS environment, may conform to local or global criteria. For example, and not by way of limitation, the FHSS environment and/or transmitted communications may conform to standards set by the Federal Communications Commission (FCC), such as C.F.R. 47 § 15.247.

In an aspect, a low-speed communication 203 may be transmitted on a communication channel 202d during time slots 201a-201g. The low-speed communication 203 may have a bandwidth. In some cases, the bandwidth may be associated with a channel width (e.g., of channel 202d) and a transmission time associated with the time slots 201 required to transmit the low-speed communication 203. For example, low-speed communication 203 is illustrated as being transmitted during seven of the time slots 201, such as the time slots 201-201g. In addition, other low-speed communications could require a larger or smaller number of the time slots 201.

Figure 3:
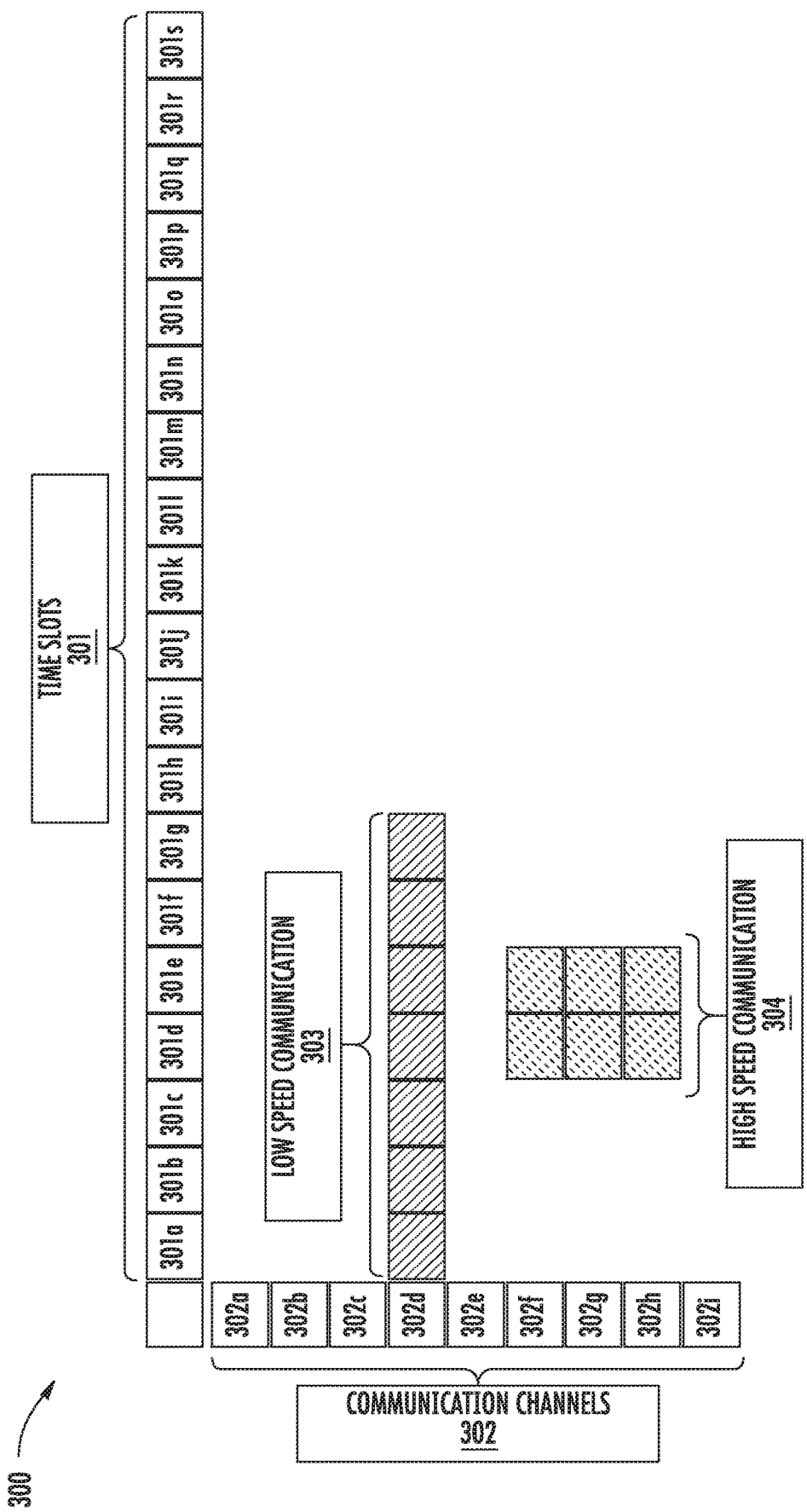
FIG. 3 is a diagram depicting an example of a mixed-signal environment.

FIG. 3 is a diagram depicting an example of a mixed-signal transmission environment 300, in which communications associated with various bandwidths may be transmitted. For example, the mixed-signal environment 300 may have multiple time slots 301a-301s, collectively referred to herein as time slots 301, and multiple communication channels 302a-302i, collectively referred to herein as communication channels 302. In some cases, the mixed-signal environment 300 could be a transmission environment with at least two signals with different transmission channel widths. In addition, the mixed-signal transmission environment could include a frequency hopping spread spectrum environment with a total bandwidth of about 26 Megahertz (MHz) of operating bandwidth and about 65 channels. Other combinations of total bandwidth and number of channels are possible.

In one aspect, the mixed-signal transmission environment is capable of transmission of a low-speed communication 303 and high-speed communication 304. For example, low-speed communication 303 may be transmitted via a low-power signal capable of being transmitted long distances, such as a signal characterized by a channel width of about 400 kilohertz (kHz), a minimum datarate of about 50 kilobits per second (kbps), a maximum physical layer (PHY) payload of about 1500 bytes, and a transmission time of about seven of the time slots 301 (e.g., time slots 301a-301g). In addition, the low-power signal may be capable of being transmitted long distances, such that the low-speed communication 303 may be received by a node that is relatively far away. In some aspects, a channel width of 400 kHz may be represented by a particular one of the communication channels 302, such as communication channel 302d including a center frequency of about 903.4 MHz or range of frequencies from about 903.2 MHz to about 903.6 MHz.

In addition, the high-speed communication 304 may be transmitted via a high-power signal capable of being transmitted intermediate distances, such as a signal characterized by a channel width of about 1200 kilohertz (kHz), a minimum datarate of about 400 kilobits per second (kbps), a maximum physical layer (PHY) payload of about 1500 bytes, and a transmission time of about two of the time slots 301 (e.g., time slots 301d-301e). In some aspects a channel width of 1200 kHz may be represented by adjacent 400 kHz channels, such as the adjacent channels 302f, 302g, and 302h. Other combinations of signal channel widths, datarates, PHY payloads, and transmission times are, however, possible.

In some aspects, communications that are transmitted in the mixed-signal transmission environment 300 are transmitted at a bandwidth that is based on an available number of the communication channels 302. For example, the low-speed communication 303 may be transmitted via the channel 302d at a relatively low bandwidth. In addition, the high-speed communication 304 may be transmitted via the combined channels 302f-302h at a relatively high bandwidth. The maximum datarate of a channel may be calculated using the Shannon Theorem, which indicates that a maximum datarate is dependent on channel bandwidth (in Hz) and a logarithm related to the signal to noise ratio. In some aspects, a higher channel bandwidth (e.g., a greater range of frequencies) may generally enable a higher maximum datarate to be transmitted via the channel. In addition, a lower channel bandwidth (e.g., a narrower range of frequencies) may generally enable a lower maximum datarate to be transmitted via the channel. In some aspects, a communication that is transmitted via multiple adjacent channels may be transmitted at a higher datarate, such as a datarate that is based on the combined frequency range of the adjacent channels.

Figure 4:
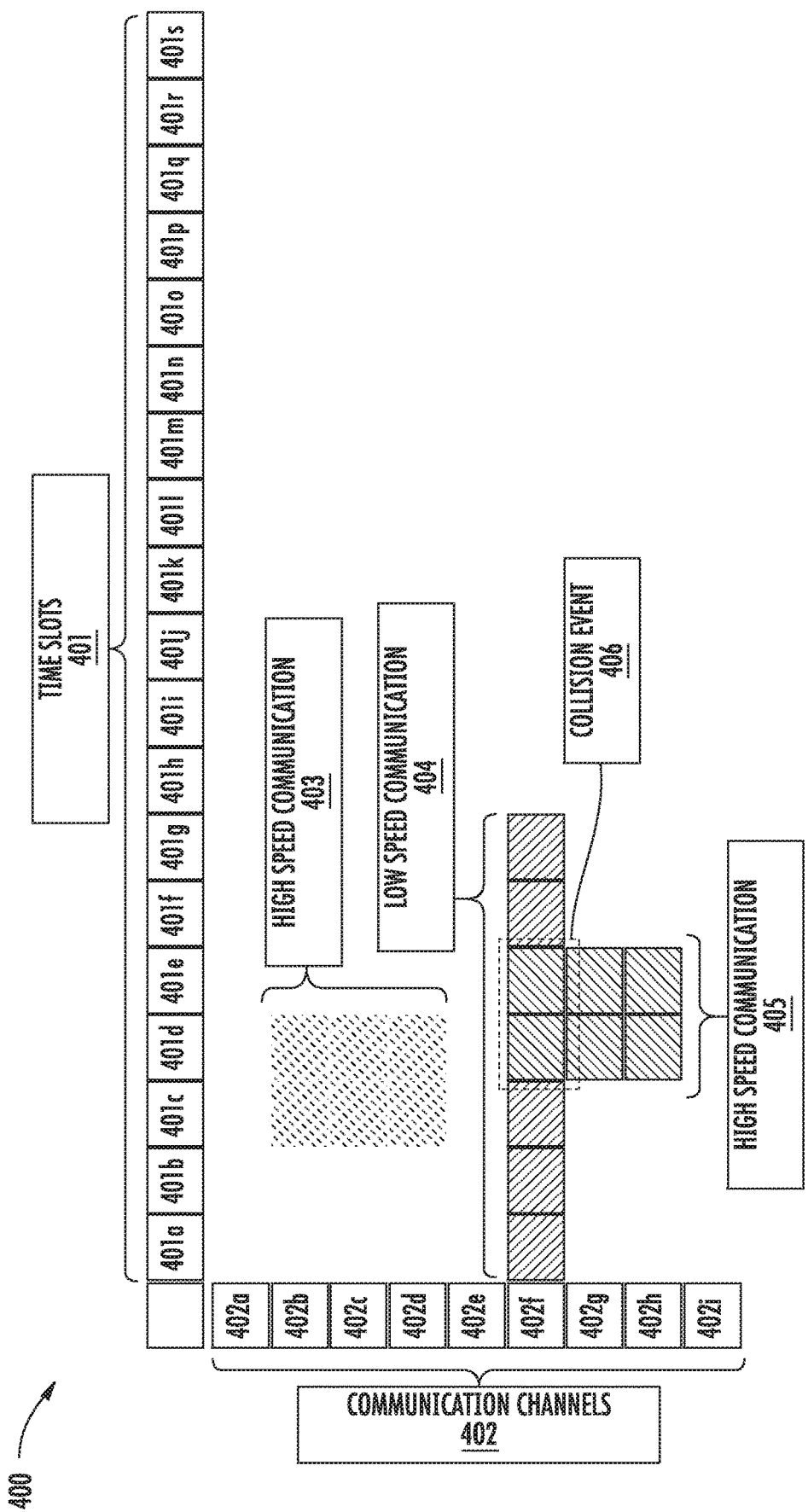
FIG. 4 is a diagram depicting a mixed-signal environment in which a collision event occurs.

FIG. 4 is a diagram depicting an example of a mixed-signal transmission environment 400, in which communications associated with various bandwidths may be transmitted. For example, the mixed-signal environment 400 may have multiple time slots 401a-401s, collectively referred to herein as time slots 401, and multiple communication channels 402a-402i, collectively referred to herein as communication channels 402. In some cases, the mixed-signal environment 400 could include at least two signals with different communication channel widths. The mixed-signal environment 400 can also include an FHSS generated based on a pseudo-random sequence.

In some aspects, communications transmitted in the mixed-signal environment 400 may be transmitted according to a channel hopping sequence that is determined for the mixed-signal environment 400. In addition, the channel hopping sequence may be determined based on multiple types of communications or transmission modes. For example, low-speed communication 404 may be a first communication transmitted in the transmission environment 400. In this non-limiting example, a first position in the channel hopping sequence may be associated with one or more of a time slot 401a or a channel 402f. A first node, such as a metering node included in a mesh network, may begin communicating according to the first position in the channel hopping sequence, such as by transmitting via the first channel 402f at time slot 401a. In the next time slot 401b, an additional communication is not begun (e.g., no nodes in the mesh network begin any additional communications).

In time slot 401c, high-speed communication 403 may be a second communication transmitted in the transmission environment 400. In this non-limiting example, the high-speed communication 403 may be transmitted at a higher bandwidth via additional channels, such as the channels 402b, 402c, and 402d. For example, a second position in the channel hopping sequence may be associated with one or more of a second time slot 401c, a channel 402c, and one or more additional channels 402d or 402b. In this case, the hopping sequence may indicate at least the center channel 402c. A second node may begin communicating according to the second position in the channel hopping sequence, such as by transmitting the high-speed communication 403 via the channel 402c. In addition, the second node may access channels adjacent to the indicated center channel 402c, such as channels 402b and 402d, for transmission of the high-speed communication 403.

In another aspect, at time slot 401e, an additional node begins transmitting high-speed communication 405. In this case, the hopping sequence includes an additional position indicating that channel 402g is available at time slot 401e. In addition, the additional node may access the adjacent channels 402f and 402h for transmission of the high-speed communication 405. The resulting access of the adjacent channels creates collision event 406. For example, a collision event can be where the low-speed communication 404 and the high-speed communication 405 are transmitted at one or more same time slots on one or more same channels (e.g., the time slots 401e and 401f on channel 402f). Alternatively, it can be where multiple high-speed communications or multiple low-speed communications are transmitted at a same time slot on a same channel. In some cases, the result of a collision event is communication loss at a receiving node.

In addition, a component that is transmitting on a particular channel may inadvertently transmit on an adjacent channel. For example, if the component is transmitting at a relatively higher power, the transmission may be detectable at frequencies that are not included in the particular channel, but which are nearby (i.e., in the frequency spectrum) to frequencies in the particular channel. Although the adjacent channel is not assigned to the component for the transmission, power related to the transmission may be detectable on one or more adjacent channels (e.g., "power leakage"). Such "leakage" of power related to the transmission may cause interference on the adjacent channels.

In some aspects, assigning a variety of available channels to the hopping sequence from across the spectrum of available channels (e.g., "spreading" the hopping sequence across the available channels) may improve transmissions on the mesh network. For example, spreading the hopping sequence across the available spectrum may decrease a likelihood of collision events, such as a collision event on an adjacent channel used for separate communications by separate network components. In addition, spreading the hopping sequence across the available spectrum may decrease a likelihood of interference, such as interference from power leakage onto frequencies in a channel that is adjacent to an assigned channel.

In some aspects, a guard channel may be selected from the communication channels 402, such as to provide a buffer between a particular communication channel (or group of channels) and other communication channels. For example, the channel 402e may be selected as a guard channel 402e adjacent to communication channel 402f. The guard channel 402e may be reserved to provide a buffer between communication channel 402f and other channels, such as communication channel 402d. For example, the guard channel 402e may include a range of frequencies that are adjacent to the frequency range of the communication channel 402f, but on which little or no data is transmitted. In addition, a guard channel may be reserved for a time duration, such as a duration based on time slots associated with the communication channel being guarded. For example, the guard channel 402e may be reserved for time slots 401a-401g, based on a duration of the low-speed communication 404 transmitted on the communication channel 402f. In some cases, a guard channel may provide a buffer from other communication channels, such that transmissions on the other communication channels are unlikely to interfere with transmissions on the particular communication channel.

In some implementations, channels may be included in a blacklist or omitted from a whitelist in addition to the channel selected for the hopping sequence. For example, the channel hopping sequence may be generated based on at least one pseudo-random number corresponding to at least the next channel, such that the channel is assigned to a particular position in the hopping sequence. Additional channels, such as guard channels or adjacent channels associated with various transmission modes, may be also associated with the particular position. The blacklist may be updated to include the assigned channel and the additional channels, or the whitelist may be updated to omit the assigned channel and the additional channels. The blacklist may include, for example, a data object that includes a list (or other indication) of channels that are not available for assignment to a particular position in the hopping sequence. In addition, the whitelist may include, for example, a data object that includes a list (or other indication) of channels that are available for assignment to the particular position.

Figure 5:
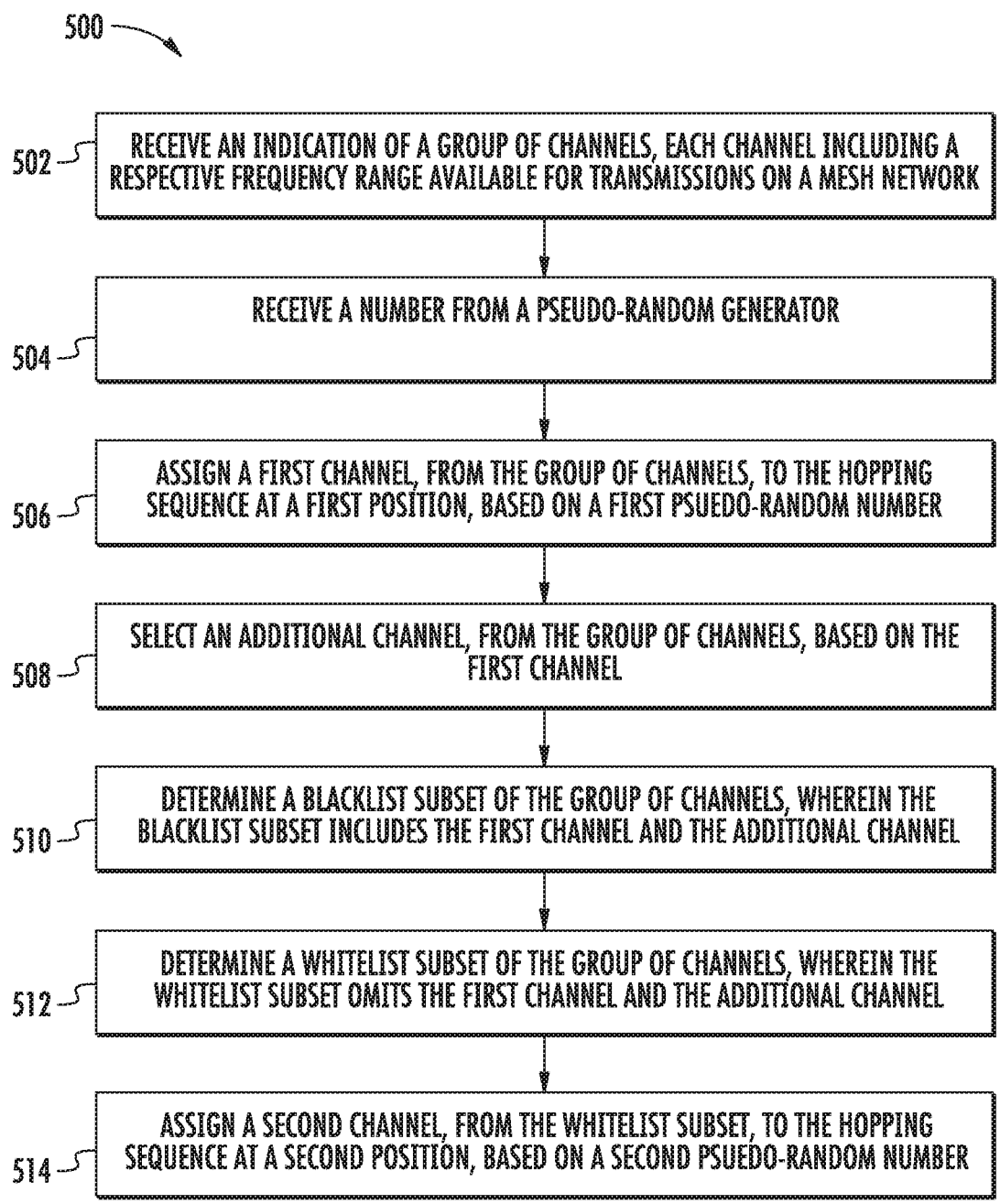
FIG. 5 is a flow chart depicting an example of a process for generating a hopping sequence.

FIG. 5 is a flow chart depicting an example of a process 500 for creating a multi-bandwidth transmission environment that minimizes signal collisions, by determining a blacklist subset of channels and a whitelist subset of channels. In some implementations, such as described in regards to FIGS. 1-4, a computing device executing a sequence generation module implements operations described in FIG. 5, by executing suitable program code. For illustrative purposes, the process 500 is described with reference to the examples depicted in FIGS. 1-4. Other implementations, however, are possible.

At block 502, the process 500 involves receiving an indication of a group of channels, each channel including a respective frequency range available for transmission on a mesh network, such as, for example, mesh network 100. In some cases, the mesh network may communicate using a frequency band defined by IEEE 802.15.4 where the total available bandwidth may be defined by authorized licensed or unlicensed communication bands. In a non-limiting example, an authorized communication band may be bounded by 902 MHz and 928 MHz. In this example, the total available bandwidth may be 26 MHz, and the number of channels may be defined by the quotient of total available bandwidth and desired channel width. For example, to obtain a channel width of 400 kHz with a total available bandwidth of 26 MHz, then there would be 65 available channels (e.g., 400 kHz×65=26 MHz). In one aspect the desired channel width may be designed to support a desired datarate, such as described by the Shannon Theorem.

At block 504, the process 500 involves receiving an indication of a pseudo-random number, for example a pseudo-random number that may be used in a frequency hopping spread spectrum environment. In some cases, the pseudo-random number may be generated by a 9-bit pseudo-random number (PN9) generator. In another aspect, other random or pseudo-random number generators may be used. In certain implementations, operations related to block 504 may be performed at various points in the process 500. For example, a first number from the pseudo-random number generator may be received subsequent to operations related to block 502, and a second number from the pseudo-random number generator may be received subsequent to operations related to another block, such as one of blocks 510 or 512.

At block 506, the process 500 involves assigning a first channel, from the group of channels, to the hopping sequence at a first position, based on a first number from the pseudo-random number generator. For example, the first position may be associated with the first channel, or a first time slot, or both, based on the first number from the PN9 generator at block 504. In some cases, the group of channels may be a list of all available channels for communication, such as available channels as received at block 502.

At block 508, the process 500 involves selecting an additional channel from the group of channels, based on the first channel, such as an additional channel that is adjacent to the first channel. For example, the adjacent channel may have a range of frequencies (e.g., about 902.8 MHz to about 903.2 MHz) that are contiguous with the range of frequencies of the first channel (e.g., about 903.2 MHz to about 903.6 MHz), such that the combined width of the first and additional channel includes a range of adjacent frequencies (e.g., about 902.8 MHz to about 903.6 MHz). In one aspect, selecting an additional channel from the group of channels may include selecting multiple additional channels, for example, a guard channel adjacent to the selected additional channel. An example of a guard channel is a channel reserved to provide a buffer to the communication channel (or channels). As a non-limiting example, an additional channel may be selected from the group of channels as the next higher adjacent channel to the first channel and a guard channel may be the next higher adjacent channel to the additional channel. In another aspect, multiple additional channels may be selected based on the channel width desired for a high-speed communication or a low-speed communication. In some cases, the one or more additional channels (including any guard channels) may be associated with the first position in the hopping sequence.

At block 510, the process 500 involves determining a blacklist subset of the group of channels, wherein the blacklist subset includes the first channel and additional channel, such as the first channel assigned at block 506, and the one or more additional channels selected at block 508. In some cases, a blacklist subset of channels includes previously assigned channels, such as the first channel assigned and one or more selected additional channels. For example, if a first channel, such as channel 402f is assigned and an additional channel 402g is selected from the communication channels 402, the blacklist subset of the group of channels may include channels 402f and 402g. In some cases, other channels may also be added to the blacklist subset based on proximity to the assigned and selected channels, for example a guard channel. In some aspects, operations related to the block 510 may be omitted from the process 500.

At block 512, the process 500 involves determining a whitelist subset of the group of channels, wherein the whitelist subset omits the first channel and the additional channel. In some cases, the whitelist subset may be an inverse set of the blacklist subset. For example, if the first channel and the additional channel are omitted from the whitelist subset, the first channel and the additional channel may be included in the blacklist subset. In some cases, the whitelist subset may include all available communication channels in the group of channels excepting the first channel and the additional channel. In other aspects, the whitelist subset may include all available channels of the group of channels excepting channels that are members of the blacklist subset. In some aspects, operations related to the block 512 may be omitted from the process 500.

At block 514, the process 500 involves assigning a second channel, from the whitelist subset to the hopping sequence at a second position, based on a second number from the pseudo-random number generator. For example, the whitelist subset may include all available channels of the group of channels omitting previously assigned channels, which may be members of the blacklist subset. In one aspect, a second channel is assigned to the hopping sequence from a pseudo-random selection of a channel in the whitelist subset. For instance, the second channel, or a second time slot, or both, may be assigned to the second time slot. In addition, a high-speed communication or low-speed communication can be initiated on the second channel at the second time slot. In some aspects, the second position may be associated with the second channel, or the second time slot, or both, based on the second number from the pseudo-random number generator at block 504.

In some aspects, channels in the whitelist (or blacklist) may be weighted to adjust a probability of being selected (or not selected). For example, if the first channel and the additional channel(s) are included in the blacklist, channels in the whitelist subset may be weighted based on how close their frequencies are to the blacklisted channels. The weighting may, for example, adjust a probability of a channel being selected as a next channel in the hopping sequence. Channels that include frequencies nearby (on the frequency spectrum) to frequencies in the blacklisted channels may be weighted to have a lower probability of selection, and channels with frequencies distant from the blacklisted channels may be weighted to have a higher probability of selection. In some cases, weighting the probability of selection may improve a spread of the hopping sequence across the available spectrum. In addition, weighting the probability of selection may decrease a likelihood of collision events or other interference occurring in the mesh network.

Although the process 500 describes creating a multi-bandwidth transmission environment by determining blacklist and whitelist subsets of channels, other implementations are possible. For example, a channel hopping sequence may be determined during use of a multi-bandwidth transmission environment, such as by assigning a channel to a position in the hopping sequence based on one or more communications currently being transmitted in the environment. The channel may be assigned to the hopping sequence based on a determination that the channel is not in use by the one or more current communications (including high-bandwidth and low-bandwidth current communications). Such implementations are deemed to be within the scope of the disclosed innovations.

In some implementations, a channel hopping sequence may be generated prior to use of the sequence. For example, a channel hopping sequence may be generated for a mesh network (e.g., by a node on the network, by a head-end system) for the mesh network to use for subsequent communications. Additionally or alternatively, a channel hopping sequence may be generated during use of the sequence, such as by assigning the next channel in the hopping sequence at each time slot. For example, during the first time slot the second channel in the sequence could be assigned to the second time slot, and during the second time slot the third channel in the sequence could be assigned to the third time slot.

In some implementations, a channel hopping sequence may be repeated in part or in whole. For example, once a time slot associated with a final position in a repeating hopping sequence passes, the next time slot may be associated with the first position in the repeating hopping sequence. In some cases, one or more final channels (e.g., in positions at the end of the repeating sequence) are assigned based on one or more of the initial channels (e.g., at the beginning positions). For example, a node generating a hopping sequence may determine the final positions in the sequence based on a blacklist that includes channels assigned to the initial positions. Using a blacklist with the initial assigned channels may reduce the likelihood of a particular channel being assigned to both the final position and the initial position in the hopping sequence. Additionally or alternatively, one or more initial channels are assigned based on one or more of the final channels in the sequence. For example, the node generating the hopping sequence may determine the initial positions based on a blacklist that includes channels assigned to the final positions.

In some cases, a subsequent channel hopping sequence may be generated, for use after completion of a previous hopping sequence. For example, once the time slot associated with the final position in the previous hopping sequence passes, the subsequent hopping sequence may be generated based on additional data received from the pseudo-random number generator. The subsequent hopping sequence may be generated based on the blacklist or whitelist, or both, from the previous hopping sequence (e.g., the blacklist or whitelist may "wrap" with the hopping sequence). For example, if the blacklist associated with the previous hopping sequence indicates that a particular channel is unavailable, such as because it was assigned to the final position in the previous hopping sequence, the first position in the additional hopping sequence may be assigned based on the whitelist of available channels (e.g., omitting the particular channel).

In some cases, a first channel may be omitted from the whitelist, or included in the blacklist, for a first time duration associated with a first transmission mode, for example, a low-speed transmission mode. When a channel is assigned to the hopping sequence at a position after the first time duration, the whitelist (or blacklist) may be updated to include (or omit) the first channel, such that the first channel is available to be assigned to the hopping sequence at an additional position that is after the first time duration. For example, FIG. 3 illustrates that channel 302$d$ may be excluded from the whitelist (or included on the blacklist) for a time duration of seven time slots, which corresponds to up to seven positions in the hopping sequence.

Furthermore, additional channels (e.g., guard channels and/or communication channels adjacent to the first channel) may be omitted from the whitelist, or included in the blacklist, for a second time duration associated with a second transmission mode, for example, a high-speed transmission mode. When a channel is assigned to the hopping sequence at a position after the second time duration, the whitelist (or blacklist) may be modified to include (or omit) the additional channels, such that the additional channels may be reassigned to the hopping sequence at an additional position that is after the second time duration. In some cases, the whitelist may be updated to include the additional channels and omit the first channel, such as if the additional position is subsequent to the second time duration and prior to the first time duration. For example, FIG. 3 illustrates that channel 302$d$ may added to the whitelist after a time duration of seven time slots, whereas channel 302$f$ may be added to the whitelist after a time duration of two time slots. In addition, the blacklist may be updated to omit the additional channels and include the first channel. Other combinations of transmission modes, channel assignments, and time durations are possible, including channels associated with multiple transmission modes, and longer or shorter time durations.

Figure 6:
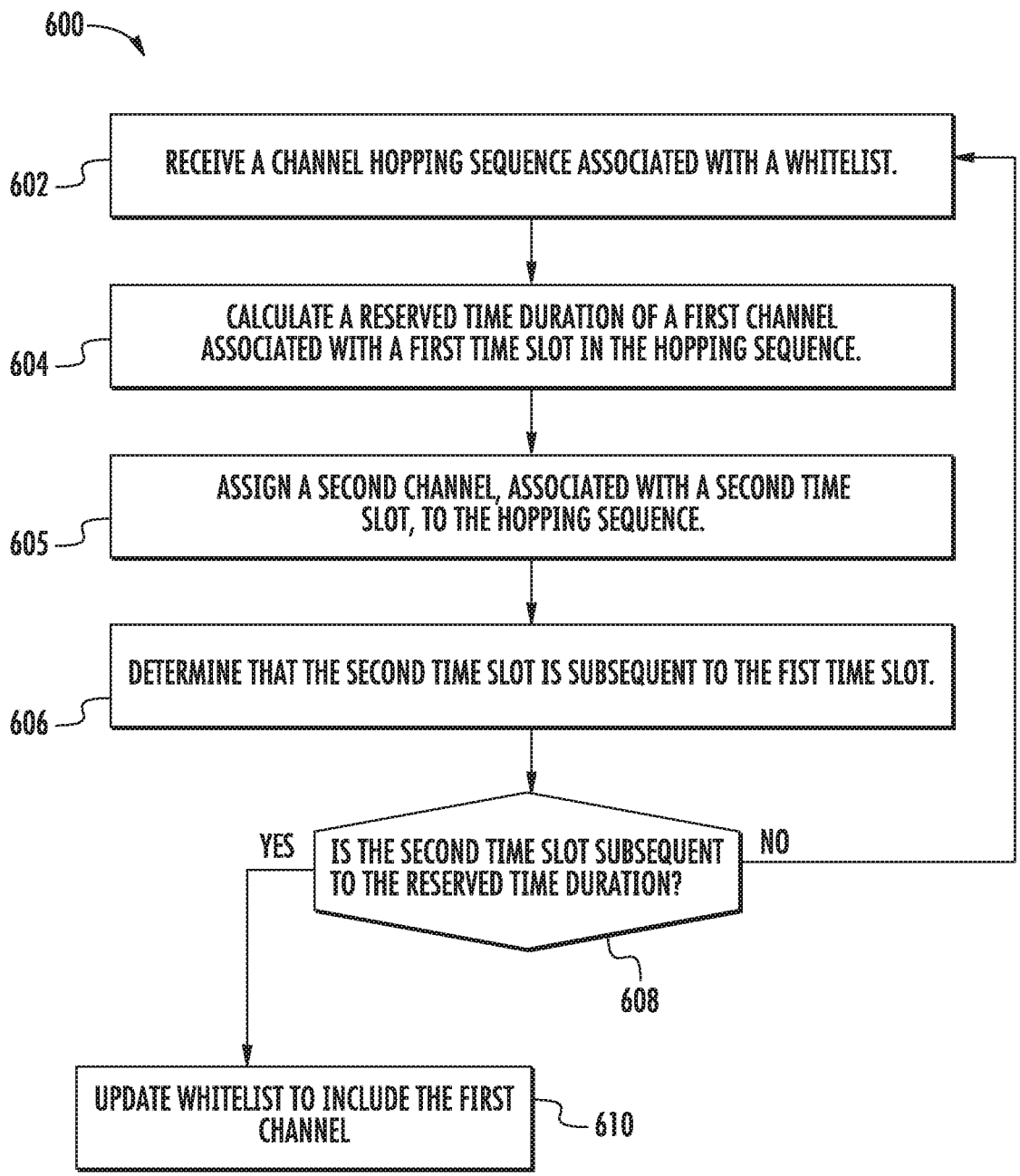
FIG. 6 is a flow chart depicting an example of a process 600 for updating a whitelist subset of channels from a group of channels in a channel hopping sequence.

FIG. 6 is a flow chart depicting an example of a process 600 for modifying a whitelist of channels, such as a whitelist associated with a channel hopping sequence. In some implementations, such as described in regards to FIGS. 1-5, a computing device executing a sequence generation module implements operations described in FIG. 6, by executing suitable program code. For illustrative purposes, the process 600 is described with reference to the examples depicted in FIGS. 1-5 and 7-9. Other implementations, however, are possible. In some implementations, the whitelist, blacklist, or both may be updated based on time durations associated with various modes of transmission for a communication, as described elsewhere herein.

At block 602, the process 600 involves receiving a channel hopping sequence, such as a channel hopping sequence generated as described in regards to FIG. 5. In one aspect, the channel hopping sequence is associated with a whitelist, such as a whitelist subset of channels available for use in the channel hopping sequence. Channels included in the hopping sequence may be associated with respective time slots or positions. For example, the hopping sequence may include a first channel associated with a first time slot, where the first channel is at a first position in the hopping sequence. The first channel may be assigned based on a first pseudo-random number from a pseudo-random number generator. In some implementations, the channel hopping sequence may be based on an output (or a modified output) of a PN9 generator. For example, a PN9 generator may generate a pseudo-random number or sequence of pseudo-random numbers that may be modified based on communications characterized by a channel width and transmission time, such as described elsewhere herein. The whitelist associated with the channel hopping sequence may omit the first channel.

At block 604, the process 600 involves calculating a reserved time duration of the first channel associated with the first time slot. In some aspects, the reserved time duration is based on a sum of the first time slot and a quantity of time slots associated with a transmission mode, or with a communication that is transmitted via the first channel. For example, the low-speed communication 303 may be transmitted via the communication channel 302$d$, as described in regards to FIG. 3. In some cases, the low-speed communication 303 is transmitted during a quantity of time slots 301$a$-301$g$. In addition, the communication channel 302$d$ may have a reserved time duration of seven time slots, based on the time slots 301$a$-301$g$ associated with the low-speed communication 303.

At block 605, the process 600 involves assigning a second channel to the hopping sequence at a second position, the second channel associated with a second time slot. In some cases, the second channel is assigned to the hopping sequence based on an additional output (or modified output) from the PN9 pseudo-random number generator, such as an additional pseudo-random number.

At block 606, the process 600 involves comparing the reserved time duration (e.g., of the first channel) with the second time slot associated with the second channel. For example, the second channel may be associated with time slot 301$j$. Operations related to block 606 may compare the reserved time duration of the communication channel 302$d$ (e.g., time slots 301$a$-301$g$ associated with the low-speed communication 303) to the second time slot 301$j$.

At block 608, the process 600 involves determining whether the second time slot is subsequent to the reserved time duration of the first channel. For example, a determination may be made whether the second time slot 301$j$ is subsequent to a final time slot (e.g., time slot 301$g$) that is associated with the low-speed communication 303.

If operations related to block 608 determine that the second time slot is not subsequent to the reserved time duration (e.g., the second time slot occurs prior to the end of the reserved time duration), process 600 may proceed to another block, such as block 602 or 604. For example, a whitelist that omits the first channel, such as communication channel 302$d$, may remain unmodified, such that the first channel remains omitted from the whitelist.

If operations related to block 608 determine that the second time slot is subsequent to the reserved time duration (e.g., the second time slot occurs after the end of the reserved time duration), process 600 may proceed to another block, such as block 610. At block 610 the process 600 involves modifying the whitelist associated with the channel hopping sequence. In some aspects, the whitelist may be updated to include the first channel. For example, responsive to determining that the second time slot 301$j$ is subsequent to the reserved time duration of the communication channel 302$d$ (e.g., subsequent to time slot 301$g$), a whitelist associated with a channel hopping sequence of the mixed-signal transmission environment 300 may be modified, such as to include the communication channel 302d.

In some aspects, operations related to the process 600 may release communication channels that were assigned to a hopping sequence at previous positions, such as to reuse the released communication channels in additional positions, or for additional communications. Furthermore, operations related to the process 600 may release various channels that are assigned to a particular position based on respective transmission modes that are associated with respective ones of the various channels. For example, in a hopping sequence associated with a mixed-signal transmission environment 700, as described in regards to FIG. 7, channels 702c, 702d, and 702e may each be assigned to the hopping sequence at a first position at a first time slot (e.g., time slot 701a). The channel 702d may be associated with a first transmission mode (e.g., a low-bandwidth mode), and may have a reserved time duration of seven time slots (e.g., time slots 701a-701g). The channels 702c and 702e may each be associated with a second transmission mode (e.g., a high-bandwidth mode), and may have a reserved time duration of two time slots (e.g., time slots 701a-701b). In some implementations, a whitelist (or blacklist) associated with the mixed-signal transmission environment 700 may be updated based on the respective transmission modes associated with various channels. For example, a sequence generation module implementing operations related to process 600 may assign at least channel 702f to a second position in the hopping sequence, such as at time slot 701g. The sequence generation module may determine that the second time slot of the second position (e.g., time slot 701g) is subsequent to the time slot of the first position (e.g., time slot 701a). In addition, the sequence generation module may compare the reserved time durations of each of channels 702c, 702d, and 702e to the second time slot. Responsive to determining that the second time slot (e.g., time slot 701g) is prior to reserved time duration of channel 702d and is subsequent to the reserved time durations of channels 702c and 702e, the whitelist for environment 700 may be modified to include channels 702c and 702e and omit (or continue to omit) channel 702d. In some cases, channels associated with a particular transmission mode (e.g., a high-bandwidth mode) are released for reuse at hopping sequence positions prior to channels associated with another transmission mode (e.g., a low-bandwidth mode).

In addition, updating the whitelist may allow a sequence generation module to update a blacklist. For example, a blacklist associated with a channel hopping sequence may indicate that one or more channels are unavailable for assignment to the channel hopping sequence (e.g., are already assigned, or might cause collisions with transmission on other channels already assigned). In some cases, a blacklist is determined as an inverse of a whitelist. In addition, the whitelist may be determined as an inverse of the blacklist. Furthermore, both the whitelist and the blacklist may be determined based on the channel hopping sequence (e.g., based on channels already assigned).

Figure 7:
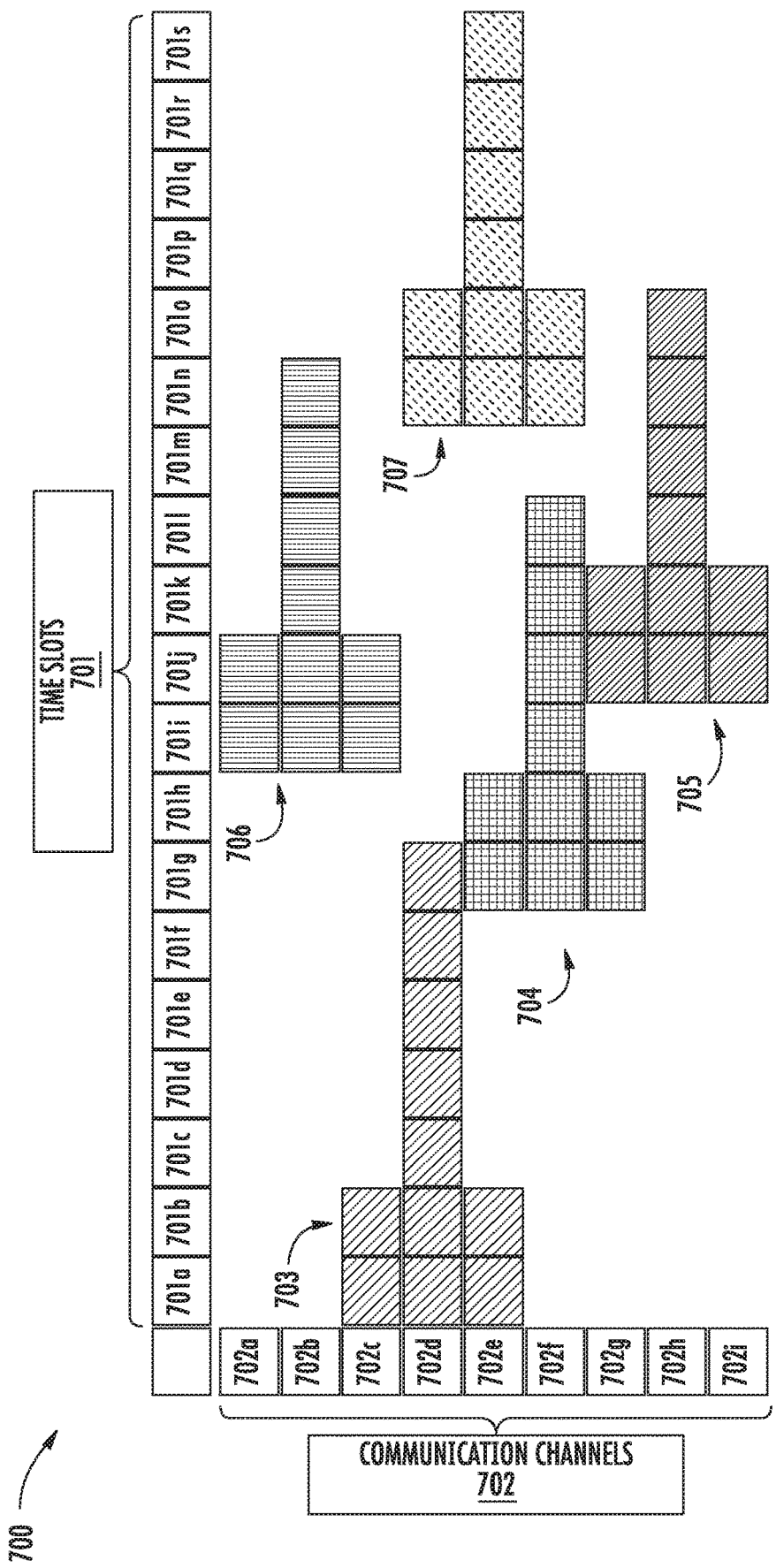
FIG. 7 is a diagram depicting a mixed signal environment according to aspects of the present disclosure.

FIG. 7 is a diagram depicting a mixed-signal transmission environment 700, according to the methods of the present disclosure. For example, mixed-signal environment 700 may have multiple time slots 701a-701s, collectively referred to herein as time slots 701, and multiple communication channels 702a-702i, collectively referred to herein as communication channels 702. In some cases, the mixed-signal environment 700 could include at least two signals with different communication channel widths. The mixed-signal environment 700 can also allow implementation of FHSS, such as a channel hopping sequence generated based on a pseudo-random sequence. In some cases, certain aspects of FIG. 7 may be better understood when considered in view of FIG. 8.

In some aspects, one or more nodes included in a mesh network may transmit communications in the mixed-signal environment 700 based on the generated channel hopping sequence. For example, a node communication 703 may be initiated at time slot 701a. In this example, the channel hopping sequence includes channel 702d at time slot 701a. The node communication 703 can be transmitted in a low-bandwidth mode or a high-bandwidth mode. In one aspect, the transmission mode may be selected based on a link quality indicator or other factors, such as an indicator determined by a link quality assessment module. Additional aspects of the transmission mode are discussed related to FIG. 8. In mixed-signal environment 700, multiple node communications, such as node communications 703, 704, 705, 706, and 707 may be respectively transmitted in a high-bandwidth or low-bandwidth mode. In a non-limiting example, node communication 703 may be transmitted in a low-bandwidth mode, while node communication 704 may be transmitted in a high-bandwidth mode. In one aspect, when a node is communicating on one or more particular channels, the particular channels may be removed from the channel hopping sequence for the duration of the communication. For example, if a node is transmitting the communication 703, the channels associated with the communication 703 (e.g., channels 702c-702e) may be removed from the hopping sequence for the duration of the transmission (e.g., during time slots 701a-701b for a high-bandwidth communication, during time slots 701a-701g for a low-bandwidth communication).

In some cases, a node may transmit a communication on a channel indicated by the channel hopping sequence, during a reserved time associated with the indicated channel. For example, a node may transmit the node communication 703 as a high-bandwidth communication on channels 702c-702e during time slots 701a-701b. In addition or alternative aspects, the node may transmit the node communication 703 as a low-bandwidth communication on channel 701d during time slots 701a-701g. In one aspect, the channel reservation may expire at or after the maximum transmission time that is reserved for the transmission mode. For example, at time slot 701g, the node communication 704 may be transmitted on channel 702e, which was reserved by node communication 703 for high-bandwidth communication (e.g., during time slots 701a-701b). Conversely, node communication 704 might not be transmitted on channel 702d, which is reserved for node communication 703 for low-bandwidth communication (e.g., during the time slot 701g). In some cases, guard channels may be used, and could include an additional channel reservation adjacent to the high- or low-bandwidth communication channels as described herein. In some aspects, a guard channel can be implemented on the a higher adjacent channel (e.g., having adjacent frequencies higher than the communication channel), a lower adjacent channel (e.g., having adjacent frequencies lower than the communication channel), or both.

Figure 8:
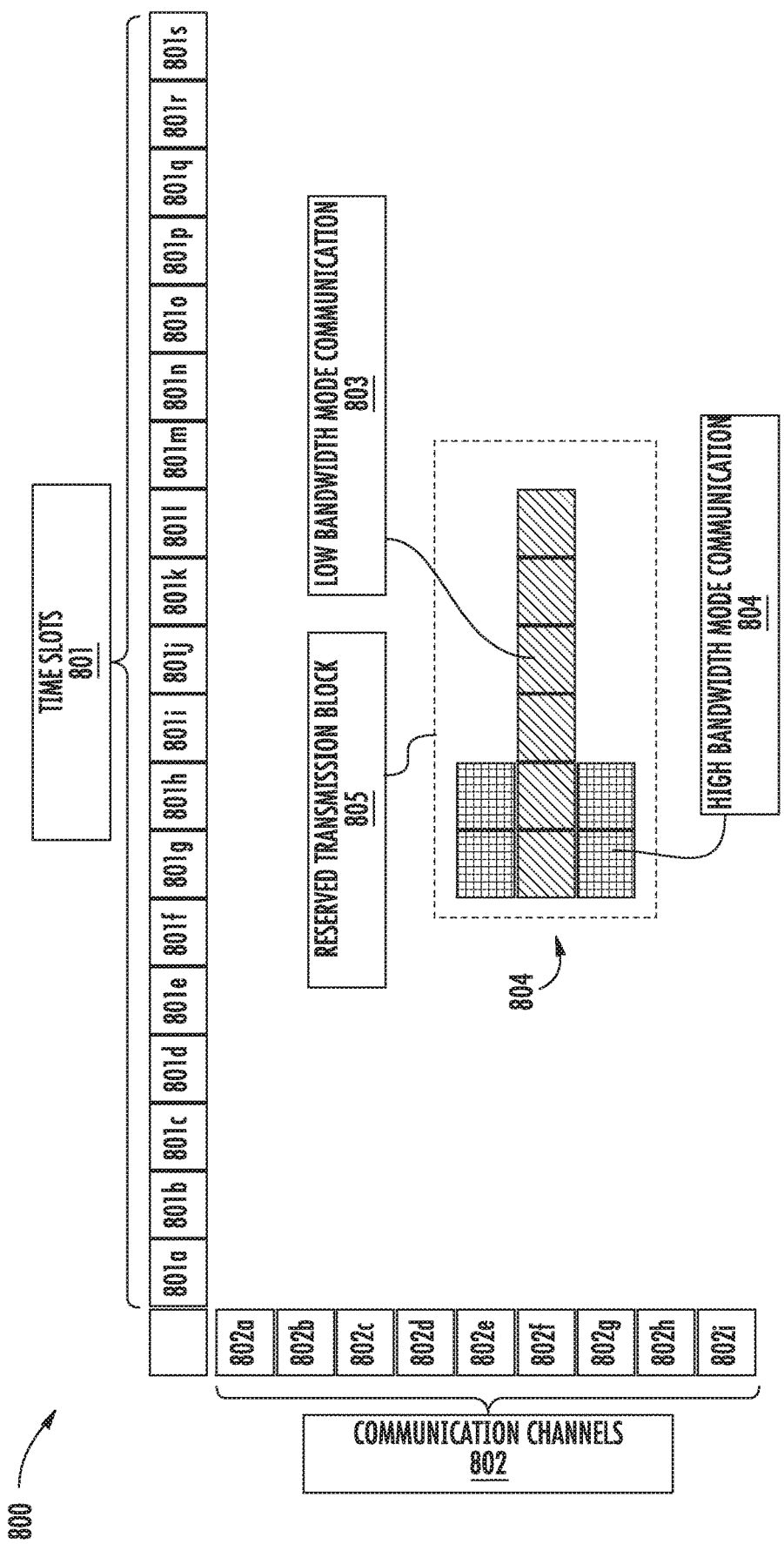
FIG. 8 is a diagram depicting an example of a reserved transmission block for transmission of a high- or low-bandwidth signal.

FIG. 8 is a diagram depicting an example of a reserved transmission block for transmission of a high- or low-bandwidth signal used for transmitting communications in mixed-signal transmission environment 800. In some cases, the mixed-signal transmission environment 800 has multiple time slots 801a-801s, collectively referred to as time slots 801, and multiple communication channels 802a-802i, collectively referred to as communication channels 802. In some cases, the mixed-signal environment 800 is suitable for multiple communications carried on transmission signals of different channel widths. While FIG. 8 is described in regards to a single communication transmitted between two nodes, it should be appreciated that such aspects may also apply to multiple communications transmitted between multiple nodes.

For example, a metering node may have data available for transmission to the collector node, such as described in relation to FIG. 1. In some cases, the metering node is capable of transmitting in a low-bandwidth mode or high-bandwidth mode. In one aspect, the metering node selects the low-bandwidth mode or high-bandwidth mode based at least in part on a link quality indicator. An example of a link quality indicator could be a signal strength metric, or another metric which relates to the capability of a transmitting node and a receiving node to have a successful communication transmission. For instance, if the link quality indicator is above a threshold signal quality, the transmitting node may transmit using high-bandwidth mode communication, such as illustrated high-bandwidth mode communication 804. In another aspect, if the link quality indicator is below a threshold signal quality, the transmitting node may transmit using low-bandwidth mode communication, such as illustrated low-bandwidth mode communication 803.

According to one aspect, a reserved transmission block 805 can be assigned for a particular communication, such that the reserved transmission block 805 would reserve channels and time slots for both a high-bandwidth mode communication, and a low-bandwidth mode communication. For example, reserved transmission block 805 includes channel 802f for time slots 801g-801l, such as a reservation for a low-bandwidth mode communication 803. In addition, the reserved transmission block 805 includes channels 802e-g for time slots 801g-h, such as a reservation for a high-bandwidth mode communication 804. In some cases, both a high-bandwidth communication mode and a low-bandwidth communication mode may be associated with any given reserved transmission block 805. For example, a transmitting node can determine, based at least in part on a link quality indicator, which mode of transmission is optimal to achieve a successful transmission using the channels and time slots included in the reserved transmission block 805.

Figure 9:
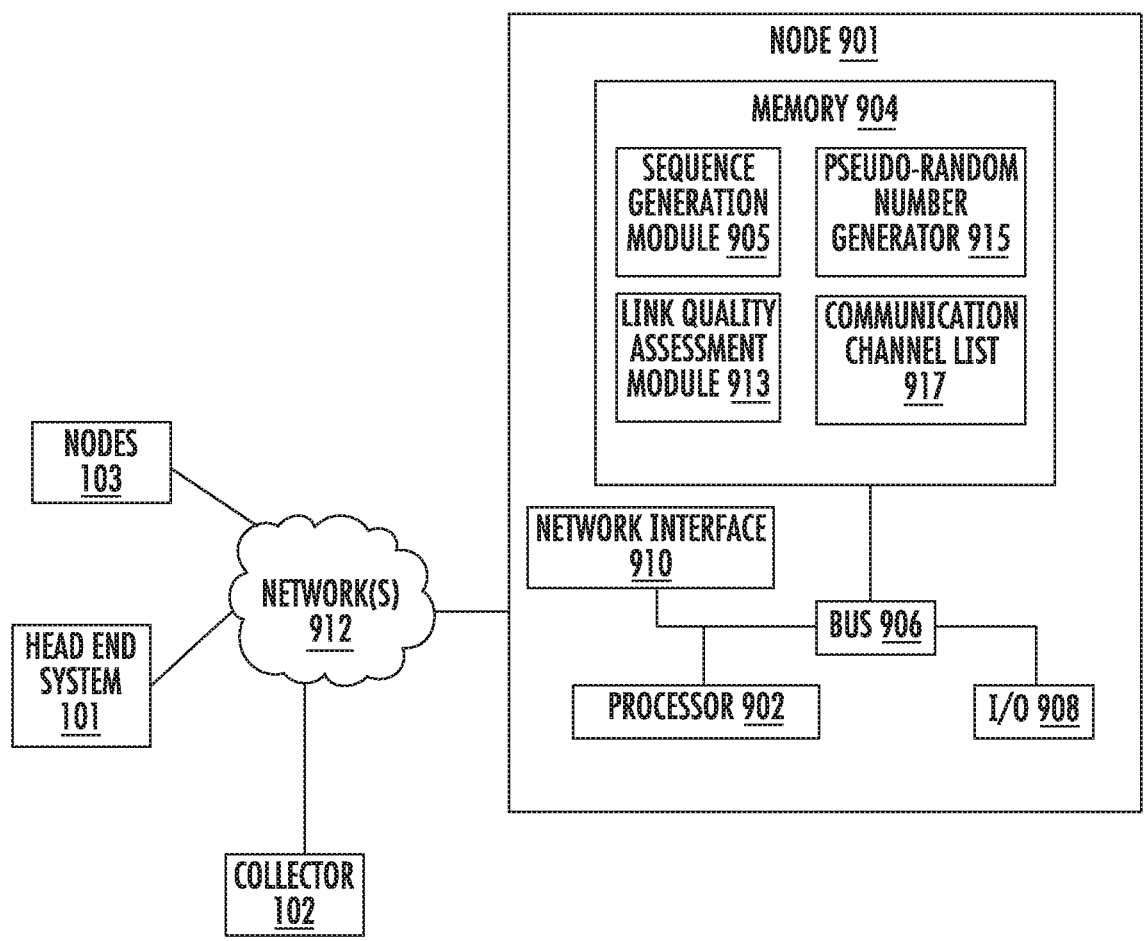
FIG. 9 is a diagram depicting an example of a computing system for generating a channel hopping sequence.

Any suitable computing system or group of computing systems can be used for performing the operations described herein. For example, FIG. 9 is a block diagram depicting a computing environment capable of generating a channel hopping sequence for a mesh network as described herein, according to certain aspects.

A node 901 may be a network component on a mesh network, such as described in regards to FIG. 1. The depicted example of a node 901 includes one or more processors 902 communicatively coupled to one or more memory devices 904. The processor 902 executes computer-executable program code or accesses information stored in the memory device 904. Examples of processor 902 include a microprocessor, an application-specific integrated circuit (ASIC), a field-programmable gate array (FPGA), or other suitable processing device. The processor 902 may include any number of processing devices, including one.

The memory device 904 includes any suitable non-transitory computer-readable medium for storing a sequence generation module 905, a link quality assessment module 913, a pseudo-random number generator 915, a communication channel list 917, and other parameters or data relating to generating the channel hopping sequence. The computer-readable medium may include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device may read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The node 901 may also include a number of external or internal devices such as input or output devices. For example, the node 901 is shown with an input/output (I/O) interface 908 that may receive input from input devices or provide output to output devices. A bus 906 may also be included in the node 901. The bus 906 may communicatively couple one or more components of the node 901.

The node 901 may execute program code that configures the processor 902 to perform one or more of the operations described above with respect to FIGS. 1-8. The program code includes operations related to, for example, one or more of sequence generation module 905, the link quality assessment module 913, the pseudo-random number generator 915, the communication channel list 917, or other suitable applications or memory structures that perform one or more operations described herein. The program code may be resident in the memory device 904 or any suitable computer-readable medium and may be executed by the processor 902 or any other suitable processor. In some aspects, the program code described above, sequence generation module 905, the link quality assessment module 913, the pseudo-random number generator 915, the communication channel list 917, and other parameters or data relating to communicating on communication channels are stored in the memory device 904, as depicted in FIG. 9. In additional or alternative aspects, one or more of sequence generation module 905, the link quality assessment module 913, the pseudo-random number generator 915, the communication channel list 917, and the program code described above are stored in one or more memory devices accessible via a data network, such as a memory device accessible via a cloud service.

The node 901 depicted in FIG. 9 also includes at least one network interface 910. The network interface 910 includes any device or group of devices suitable for establishing a wired or wireless data connection to one or more data networks 912. Non-limiting examples of the network interface 910 include an Ethernet network adapter, a modem, radio transmitter and/or the like. The group of metering nodes 103, head-end system 101, and collector 102 are connected to the node 901 via network 912. The network 912 may include a mesh network, such as described herein. In some cases, the network 912 may include additional networks, such as (without limitation) the Internet, a private network (including a virtual private network), or any other suitable network. In some implementations, the group of metering nodes 103, the head end system 101, or the collector 102 may perform some of the operations described herein, such as generating the hopping sequence. The node 901 may be able to communicate with one or more of the metering nodes 103, head-end system 101, and collector 102 using the network interface 910.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or di splay devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific implementations thereof, it will be appreciated that those skilled in the art, upon attaining an understanding of the foregoing, may readily produce alterations to, variations of, and equivalents to such implementations. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method of generating a channel hopping sequence for communicating across a wireless mesh network, the method comprising:
   receiving an indication of a group of channels, each channel including a respective frequency range for communicating on the wireless mesh network and available for use in the channel hopping sequence, wherein the channel hopping sequence defines an ordered sequence of channel numbers spanning multiple time slots;
   receiving, from a pseudo-random number generator, an indication of a first number;
   assigning a first channel, from the group of channels, to the channel hopping sequence at a first position in the channel hopping sequence, based on the first number;
   selecting an additional channel, from the group of channels, wherein the additional channel is adjacent to the first channel,
      wherein frequencies included in a first width of the first channel are available at a first time slot for a first transmission mode,
      wherein frequencies included in a combined width of the first channel and the additional channel are available at the first time slot for a second transmission mode;
   determining a whitelist subset of the group of channels, wherein the whitelist subset omits the first channel and the additional channel; and
   assigning a second channel, from the whitelist subset, to the channel hopping sequence at a second position in the channel hopping sequence, based on a second number received from the pseudo-random number generator.

2. The method of claim 1, further comprising determining a blacklist subset of the group of channels, wherein the blacklist subset includes the first channel and the additional channel, wherein:
   the blacklist subset indicates that the first channel is unavailable for a first quantity of time slots that is based on a maximum transmission time of the first transmission mode, and
   the blacklist subset indicates that the additional channel is unavailable for an additional quantity of time slots that is based on a maximum transmission time of the second transmission mode.

3. The method of claim 1, further comprising:
   calculating a reserved time duration of the first channel, wherein the reserved time duration is based on a sum of the first time slot and a quantity of time slots associated with a maximum transmission time of the first transmission mode;
   assigning a third channel, from the group of channels, to the channel hopping sequence at a third position, based on a third number received from the pseudo-random number generator, wherein the third position is associated with a third time slot;
   based on a comparison of the reserved time duration and the third time slot, determining that the third time slot is subsequent to the reserved time duration; and
   responsive to determining that the third time slot is subsequent to the reserved time duration, updating the whitelist subset to include the first channel.

4. The method of claim 3, further comprising:
   calculating an additional reserved time duration of the additional channel, wherein the additional reserved time duration is based on an additional sum of the first time slot and an additional quantity of time slots associated with an additional maximum transmission time of the second transmission mode; and
   responsive to determining that the third time slot is subsequent to the additional reserved time duration, updating the whitelist subset to include the additional channel.

5. The method of claim 1, wherein a communication that is transmitted via the second transmission mode is transmitted via a combination of frequencies included in the respective frequency ranges of the first channel and the additional channel.

6. The method of claim 1, wherein:
the first transmission mode is a low-bandwidth transmission mode, and
the second transmission mode is a high-bandwidth transmission mode.

7. The method of claim 1, further comprising:
selecting another channel from the group of channels based on the first channel,
wherein frequencies included in a combined width of the first channel and at least the another channel are available at the first time slot for a third transmission mode,
wherein the whitelist subset further omits the another channel.

8. The method of claim 1, wherein a node device on the mesh network:
selects the first position in the channel hopping sequence for a communication with an additional node on the mesh network;
determines the first channel and the first time slot based on the first position in the channel hopping sequence;
determines a signal quality associated with the additional node; and
based on the signal quality, selects the first transmission mode or the second transmission mode for the communication,
wherein the first transmission mode is selected responsive to determining that the signal quality is below a threshold signal quality,
wherein the second transmission mode is selected responsive to determining that the signal quality is above the threshold signal quality.

9. A node capable of generating a channel hopping sequence for communicating on a wireless mesh network, the node comprising a processor configured with code to perform operations comprising:
receiving an indication of a group of channels, each channel including a respective frequency range for communicating on the wireless mesh network and available for use in the channel hopping sequence, wherein the channel hopping sequence defines an ordered sequence of channel numbers spanning multiple time slots;
receiving, from a pseudo-random number generator, an indication of a first number;
assigning a first channel, from the group of channels, to the channel hopping sequence at a first position in the channel hopping sequence, based on the first number;
selecting an additional channel, from the group of channels, wherein the additional channel is adjacent to the first channel,
wherein frequencies included in a first width of the first channel are available at a first time slot for a first transmission mode,
wherein frequencies included in a combined width of the first channel and the additional channel are available at the first time slot for a second transmission mode;
determining a whitelist subset of the group of channels, wherein the whitelist subset omits the first channel and the additional channel; and
assigning a second channel, from the whitelist subset, to the channel hopping sequence at a second position in the channel hopping sequence, based on a second number received from the pseudo-random number generator.

10. The node of claim 9, the operations further comprising:
calculating a reserved time duration of the first channel, wherein the reserved time duration is based on a sum of the first time slot and a quantity of time slots associated with a communication transmitted via the first channel;
assigning another channel, from the group of channels, to the channel hopping sequence at another position, based on another number received from the pseudo-random number generator, wherein the another position is associated with another time slot;
based on a comparison of the reserved time duration and the another time slot, determining that the another time slot is subsequent to the reserved time duration; and
responsive to determining that the another time slot is subsequent to the reserved time duration, updating the whitelist subset to include the first channel.

11. The node of claim 10, the operations further comprising:
calculating an additional reserved time duration of the additional channel, wherein the additional reserved time duration is based on an additional sum of the first time slot and an additional quantity of time slots associated with an additional maximum transmission time of the second transmission mode; and
responsive to determining that the another time slot is subsequent to the additional reserved time duration, updating the whitelist subset to include the additional channel.

12. The node of claim 9, wherein a communication that is transmitted via the second transmission mode is transmitted via a combination of frequencies included in the respective frequency ranges of the first channel and the additional channel.

13. The node of claim 9, the operations further comprising:
selecting the first position in the channel hopping sequence for a communication with an additional node on the mesh network;
determining the first channel and the first time slot based on the selected first position in the channel hopping sequence;
determining a signal quality associated with the additional node; and
based on the signal quality, selecting the first transmission mode or the second transmission mode for the communication,
wherein the first transmission mode is selected responsive to determining that the signal quality is below a threshold signal quality,
wherein the second transmission mode is selected responsive to determining that the signal quality is above the threshold signal quality.

14. The node of claim 13, wherein:
the first channel is associated with the first transmission mode and the additional channel is associated with the second transmission mode;
responsive to selecting the first transmission mode, the node transmits the communication via the respective frequency range included in the first channel; and responsive to selecting the second transmission mode, the node transmits the communication via a combination of the respective frequency ranges of the first channel and the additional channel.

15. A wireless mesh network comprising multiple nodes, wherein at least one node of the multiple nodes is capable of generating a channel hopping sequence, such that each of the multiple nodes communicates on the wireless mesh network according to the generated channel hopping sequence,
wherein the at least one node comprises a processor configured with code to perform operations comprising:
receiving an indication of a group of channels, each channel including a respective frequency range for communicating on the wireless mesh network and available for use in the channel hopping sequence, wherein the channel hopping sequence defines an ordered sequence of channel numbers spanning multiple time slots;
receiving, from a pseudo-random number generator, an indication of a first number;
assigning a first channel, from the group of channels, to the channel hopping sequence at a first position in the channel hopping sequence, based on the first number;
selecting an additional channel, from the group of channels, wherein the additional channel is adjacent to the first channel,
wherein frequencies included in a first width of the first channel are available at a first time slot for a first transmission mode,
wherein frequencies included in a combined width of the first channel and the additional channel are available at the first time slot for a second transmission mode;
determining a whitelist subset of the group of channels, wherein the whitelist subset omits the first channel and the additional channel; and
assigning a second channel, from the whitelist subset, to the channel hopping sequence at a second position in the channel hopping sequence, based on a second number received from the pseudo-random number generator.

16. The wireless mesh network of claim 15, the operations further comprising determining a blacklist subset of the group of channels, wherein the blacklist subset includes the first channel and the additional channel, wherein:
the blacklist subset indicates that the first channel is unavailable for a first quantity of time slots that is based on a maximum transmission time of the first transmission mode, and
the blacklist subset indicates that the additional channel is unavailable for an additional quantity of time slots that is based on a maximum transmission time of the second transmission mode.

17. The wireless mesh network of claim 15, the operations further comprising:
calculating a reserved time duration of the first channel, wherein the reserved time duration is based on a sum of the first time slot and a quantity of time slots associated with a communication transmitted via the first channel;
assigning another channel, from the group of channels, to the channel hopping sequence at another position, based on another number received from the pseudo-random number generator, wherein the another position is associated with another time slot;
based on a comparison of the reserved time duration and the another time slot, determining that the another time slot is subsequent to the reserved time duration; and
responsive to determining that the another time slot is subsequent to the reserved time duration, updating the whitelist subset to include the first channel.

18. The wireless mesh network of claim 15, wherein a communication that is transmitted via the second transmission mode is transmitted via a combination of frequencies included in the respective frequency ranges of the first channel and the additional channel.

19. The wireless mesh network of claim 15, wherein a particular node of the multiple nodes:
selects the first position in the channel hopping sequence for a communication with an additional one of the multiple nodes;
determines the first channel and the first time slot based on the first position in the channel hopping sequence;
determines a signal quality associated with the additional one of the multiple nodes; and
based on the signal quality, selects the first transmission mode or the second transmission mode for the communication,
wherein the first transmission mode is selected responsive to determining that the signal quality is below a threshold signal quality,
wherein the second transmission mode is selected responsive to determining that the signal quality is above the threshold signal quality.

20. The wireless mesh network of claim 19, wherein:
the first channel is associated with the first transmission mode and the additional channel is associated with the second transmission mode;
responsive to selecting the first transmission mode, the particular node transmits the communication via the respective frequency range included in the first channel; and
responsive to selecting the second transmission mode, the particular node transmits the communication via a combination of the respective frequency ranges of the first channel and the additional channel.

* * * * *